July 30, 1940.　　A. E. MAYNARD　　2,209,605
LENS EDGING MACHINE
Filed April 25, 1938　　2 Sheets-Sheet 1
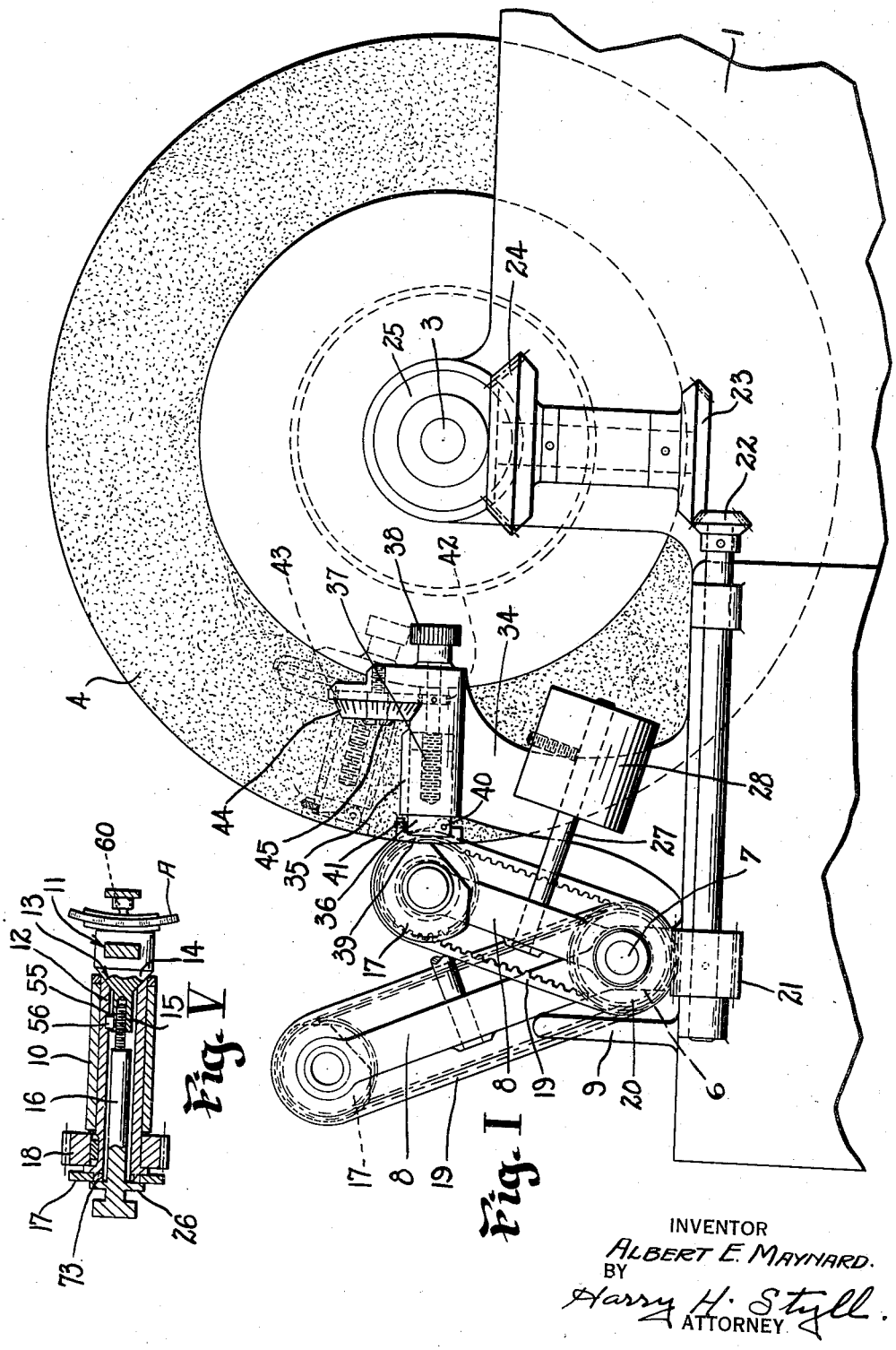
INVENTOR
ALBERT E. MAYNARD.
BY
Harry H. Styll
ATTORNEY July 30, 1940.  A. E. MAYNARD  2,209,605
LENS EDGING MACHINE
Filed April 25, 1938  2 Sheets-Sheet 2
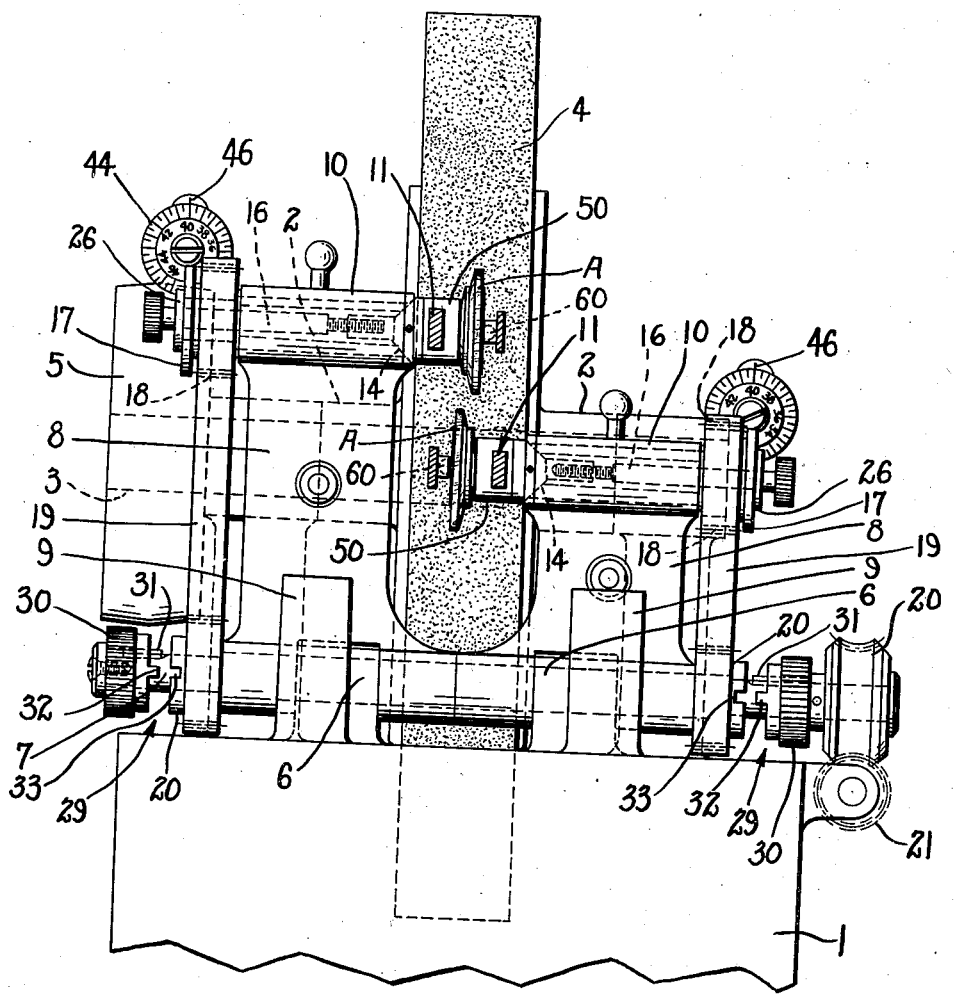
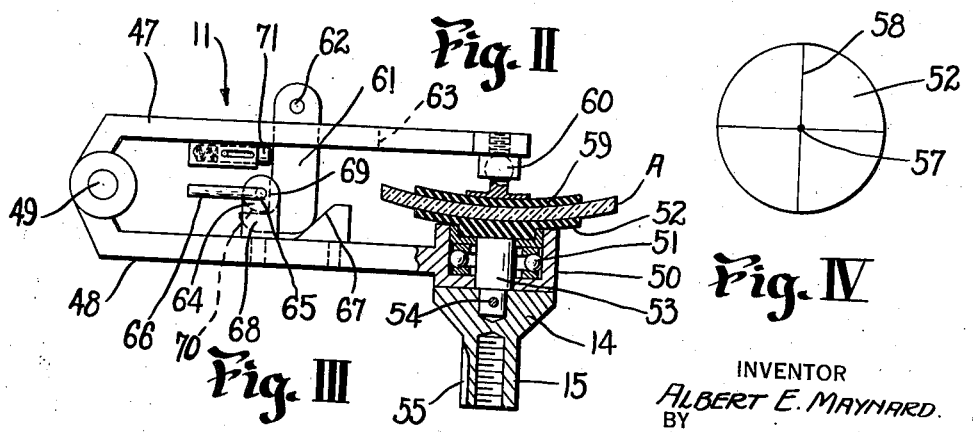
INVENTOR
ALBERT E. MAYNARD.
BY
Harry H. Styll
ATTORNEY Patented July 30, 1940

2,209,605

UNITED STATES PATENT OFFICE 2,209,605

LENS EDGING MACHINE

Albert E. Maynard, Southbridge, Mass., assignor to American Optical Company, Southbridge, Mass., a voluntary association of Massachusetts Application April 25, 1938, Serial No. 204,029

5 Claims. (Cl. 51—101)

This invention relates to improvements in abrading machinery and has particular reference to a machine for edging glass articles.

One of the principal objects of the invention is to provide a machine of the above character which is simple in construction and will enable the edging of a plurality of glass articles simultaneously through the use of single abrading means, and which will greatly increase the accuracy of such edging.

Another object is to provide novel means for supporting the glass articles during the abrading operation.

Another object is to provide an abrading device for simultaneously abrading a plurality of glass articles wherein each of said articles is separately supported and is separately interchangeable.

Another object is to provide a novel construction of machine of the above character wherein a plurality of work operating heads are provided and operated by a single source of power.

Another object is to provide a machine adapted particularly for surfacing the contour edges of lenses.

Another object is to provide a machine of the above character which will require but little space and which will perform the functions of a plurality of separate machines of a similar nature.

Other objects and advantages of the invention will become apparent from the following description taken in connection with the accompanying drawings, and it will be apparent that many changes may be made in the details of construction and arrangements of parts without departing from the spirit of the invention as expressed in the accompanying claims. I, therefore, do not wish to be limited to the exact details and arrangements shown and described, as preferred forms only have been given by way of illustration.

Referring to the drawings:

Fig. I is a fragmentary side elevation of the machine embodying the invention;

Fig. II is a front elevation of the machine illustrated in Fig. I;

Fig. III is an elevation of the clamping device for holding the work with portions thereof shown in cross section;

Fig. IV is a plan view of the face of one of the clamping pads of the device shown in Fig. III; and Fig. V is a fragmentary sectional view of the attaching mechanism for the lens holding means.

Machines of the character described herein are known commercially as edging machines, adapted particularly for use in surfacing the edges of ophthalmic lenses to the desired contour shapes.

It is known that machines of this nature have been provided with a plurality of work supporting heads, but as far as is known separate power means were provided for each of said heads and the work, such as lenses, was transferred from a separate holding device to the holding device of the machine.

The present invention differs from known prior art machines of this character in that it provides a plurality of work supporting heads operated by a single source of power and which is so constructed that the work is not transferred from its holding means when located in position on the machine. This arrangement, therefore, is one of the primary features of applicant's invention and, due to the fact that the lens is not transferred from one holding device to another when positioned in the machine, the possibility of error due to displacements which might occur during such transfer is obviated. This arrangement also greatly increases the accuracy of edging such lenses and, due to the plurality of work supporting heads, the time required in edging a plurality of lenses is greatly reduced and the cost of equipment likewise reduced.

Referring more particularly to the drawings wherein like characters of reference designate like parts throughout the several views, the device embodying the invention comprises, broadly, a base 1 having spaced bearings 2 in which is journaled a shaft 3 on which a stone 4 is mounted. The stone 4 is rotated by means of a pulley 5 driven by a power operated belt or other suitable means.

Secured to the upper face of the base 1 are two bearings 6 supporting a shaft 7 on which are pivoted the swinging heads 8. The base 1 is provided with stops 9 adjacent the bearings 6 for limiting the outward pivotal movement of the heads 8, as shown in Fig. I.

The heads or supports 8 are of different heights to allow the lenses A, supported thereby, to simultaneously engage the face of the stone 4.

Each of the bearings 10 has a tubular sleeve 12 rotatably mounted therein. The sleeve 12 is provided with a tapered end 13 adapted to receive a similarly tapered end 14 of the lens holder 11. The said tapered portion 14 has a reduced extension 15 provided with a threaded bore and is secured to the tapered end of the tubular sleeve 12 by a thumb screw 16. The tubular member 12 has a former 17 of the contour shape desired of the finished lens, and also has a gear 18 thereon adjacent the former 17 which meshes with a toothed belt-like member 19 connected through a train of gears 20, 21, 22, 23 and 24 to a gear 25 mounted on the shaft 3 of the stone. Each of the heads 8 are rotated through a similar gear connection.

The former 17 is held on the end of the tubular member 12 by a flange portion 26 on the thumb screw 16.

Each of the supports 8 are provided with a rod extension 27 having an adjustable weight 28 thereon. These weights function as means for controlling the pressure of the work on the stone 4 during the edging operation. If desired, suitable springs may be used for urging the work towards the stone instead of the weights.

In order to operate the heads either separately or simultaneously, suitable clutch members 29 are provided. The said clutch members constitute a nut-like member 30 keyed, as illustrated at 31, to the shaft 7 and having a tongue 32 thereon movable into and out of engagement with a slot 33 in the side of the gear member 20. The said clutch members 29 provide means whereby the drive connection between the shaft 7 and the lens holding members may be separately controlled.

The base 1 is provided with uprights 34 on the opposite sides of the stone 4, each having a bearing 35 adjacent the upper ends thereof in which is slidably and adjustably supported a plunger 36 having a screw connection 37 with a thumb screw 38.

The plungers 36 each have a contact shoe 39 pivoted thereto, as illustrated at 40, about a center offset from the longitudinal axis of the plunger 36. The face of each contact shoe 39 may be tilted relative to the longitudinal axis of the plunger 36 about the pivot 40 and is held in adjusted position by a lock screw 41. The object of tilting the face of the contact shoe 39 is to provide means for varying the axial disposition of the lens relative to the face of the stone 4 and also provides means whereby the face of the contact shoe 39 may be disposed substantially in the same plane as the face of the stone which is engaged by the edge of the lens during the edging operation.

The thumb screw 38 is provided with a gear 42 in constant mesh with a gear 43 having a dial 44 associated therewith and adapted to be rotated about a pivot 45 when the thumb screw is rotated during the in and out adjustment of the contact shoe 39. The dial 44 cooperates with a suitable indicator 46 and provides means for determining the resultant size to which the lens is to be edged. It is quite obvious that if the former shoe 39 is adjusted in a direction rearwardly of the surface of the stone 4, the lens will move inwardly toward the stone and thereby be reduced in size, and if the said former shoe 39 is adjusted in a direction outwardly of the face of the stone 4, the resultant size of the lens will be greater. The dial 44 is so graduated as to indicate the accurate size to which the lens is to be produced.

The lens holder 11 comprises spaced arms 47 and 48, pivotally connected at 49. The arm 48 has a cup-like end 50 in which is supported a roller bearing 51 and has secured thereto a pad 52 provided with a stud 53 extending through said roller bearing and an opening formed in the base of the cup-like portion 50. The stud 53 is secured by a dowel pin, or the like, 54, to the tapered portion 14. The said tapered portion, as previously described above, has a reduced extension 15 provided with a threaded bore in which the thumb screw 16 is threaded, as illustrated in Fig. V. The said reduced portion 15 also has a key slot 55 in the side thereof, adapted to interlock with a key 56 carried by the tubular member 12.

The face of the pad 52 is provided with suitable centering and aligning means 57 and 58 with which the center and major axis of the lens A are adapted to be aligned when positioned on said pad.

The arm 47 has a pad 59 connected thereto by a ball and socket connection 60. The said pads 52 and 59 may be formed of a resilient or pliable composition. The arm 47 has a latch member 61 pivoted thereto, as illustrated at 62. The said latch member 61 extends through an opening 63 in the arm 47 and is adapted to engage a cam 64 pivoted at 65 to a projection on the arm 48. The said cam member 64 is operated by a suitable lever 66. The latch member 61, when the arm 47 is moved toward the arm 48, is adapted to engage the angled surface 67 of a cam member carried by the arm 48, and the hook shaped end 68 of said latch member is adapted to be moved by the cam 67 beneath the cam member 64. It is to be understood that the said cam member 64 is adjusted to a position wherein its low point 69 will permit the said hooked end 68 to be moved thereunder. When in this position the lever 66 is rotated to move the high stop 70 of the cam into engagement with the hook shaped end 68 to cause the arm 47 to move toward the arm 48. It is to be understood that the arm 47 may be formed of resilient material which will permit the said arm to give slightly as the pressure is increased on the pad 59 and thereby constantly and resiliently urge the pad 59 into engagement with the lens A and hold the said lens on the pad 52.

A spring plunger 71 is provided on the arm 47 for engaging the latch member 61 when pressure on the end of the hook shaped end 68 is released by the cam member 64 to automatically urge the latch member upwardly of the inclined surface 67 and thereby automatically move the arm 47 away from the arm 48.

During the use of the device, the lens A and the supporting mechanism, therefore, is free to rotate in the cup-like bearing 50 with the said rotation being caused by rotation of the tubular member 12 through its gear connection 18 with the train of gears set forth above. The key connection 55 and 56 automatically positions the major axis of the lens in desired aligned relation with the major axis of the former 17.

The resultant shape of the lens is controlled by the shape of the former 17 so that it is to be understood that a plurality of differently shaped formers are provided and may be quickly and easily positioned in connection with the tubular member 12 when the lens holding means 11 is connected to said tubular means.

The resultant size of the lens, as previously stated above, is controlled by adjusting the contact shoe 39 inwardly and outwardly of the face of the stone 4 and may be directly determined by the dial member 44 and indicator means 46.

The operation of the device is substantially as follows:

The lens A to be edged is placed in aligned position in the holding means 11. A former 17 of the contour shape desired is placed on its connecting means with the tubular member 12 and the lens holder 11 and said former are held in connected relation with said tubular member 12 by the thumb screw 16. The key connection 55 and 56 automatically positions the major axis of the lens A in aligned relation with the major axis of the former 17. It is to be understood that the former 17 has a suitable key connection 73 with the tubular member 12, which key connection is aligned with the key connection 55 and 56 of the lens holder 11 to the tubular member 12.

The tongue 32 of the clutch 29 is then moved inwardly of the groove 33 to transmit rotary power from the shaft 7 to the tubular member 12 through the toothed belt 19. The head 3 is then swung toward the stone to allow the weight 28 to respond to the action of gravity and exert a given pressure of the lens A on the face of the stone 4. The stone normally rotates at a higher rate of speed than the lens A so that the edge of the lens is gradually removed by said stone until the former 17 engages the contact shoe 39 and rotates at least one complete revolution when in engagement with said contact shoe.

The adjustment of the angle of the contact shoe 39, and the position thereof as determined by the dial 44 and indicator means 46, is made prior to subjecting the lens to the edging operation, so that when the abrading operation is completed, the lens will be reduced to the desired size and contour shape.

When one lens has been edged to the size and shape desired, the clutch 29, which rotates the head supporting said lens, is disengaged, the lens holder 11 is then removed from the head and a new lens holder having another aligned lens A thereon is connected with said head and moved into operating position with the stone. This arrangement provides means whereby the lens A may be quickly and accurately aligned in the holder 11 and may be quickly and easily positioned in abrading position in the edging machine without affecting the abrading operation of the other abrading head of the machine.

Due to the fact that the lens A remains in the holder 11 and that the said holder with the lens A therein is secured in desired position in the head of the machine, danger of disalignment of the lens in the holder is obviated.

From the foregoing description it will be seen that simple, efficient and economical means have been provided for obtaining all of the objects and advantages of the invention, particularly an arrangement whereby the lenses to be edged may be accurately supported in abrading position and with which a plurality of lenses may be handled and edged in a relatively short time and with the edging operation very accurately performed.

Having described my invention, I claim:

1. In a device of the character described, the combination of an abrading wheel rotatably supported on a base and a pair of work supporting heads pivoted to said base about a common axis substantially parallel with the axis of rotation of the wheel, one to the right and the other to the left of the vertical center line of said wheel, and for movement toward and away from the face of the wheel, one of said work supporting heads being located above the other in the direction of the longitudinal face of the wheel, and means for imparting a separate rotary drive to each of said heads, with the axis of rotation of each of said heads substantially parallel with each other and parallel with the axis of rotation of the abrading wheel.

2. In a device of the character described, the combination of a rotary abrading wheel, means for rotating said wheel, a pair of work supporting heads pivoted about a common axis substantially parallel with the axis of rotation of the wheel, with one of said heads being located substantially to the left of the vertical center line of the wheel, and the other to the right of said center line, with both of said heads being movable toward and away from the face of the abrading wheel, means rotatably supported in said head and operably connected with and driven by the means for rotating the wheel, and work holding means detachably connected with said means rotatably supported in said heads for holding work to be abraded by said wheel, with the said heads being located one above the other, so that the pieces of work will lie in spaced relation with each other in the direction of the longitudinal face of the wheel.

3. In a device of the character described, the combination of a rotary abrading wheel, means for imparting a driving rotary movement to said wheel, a pair of work supporting heads pivoted about a common axis substantially parallel with the axis of rotation of the wheel, with one of said heads being located substantially to the left of the center line of the wheel, and the other to the right of said center line, with both of said heads being movable toward and away from the face of the abrading wheel, means rotatably supported in said head and operably connected with and driven by the means for rotating the wheel, and work holding means detachably connected with said means rotatably supported in said heads for holding work to be abraded by said wheel, with the said heads being located one above the other, so that the pieces of work will lie in spaced relation with each other in the direction of the longitudinal face of the wheel, and means associated with said work supporting heads and the means for imparting a driving action to the abrading wheel, separately controllable, for starting and stopping the rotary movement of said work holding means.

4. In a device of the character described, the combination of a base having an abrading tool rotatably supported thereon, a pair of work supporting heads pivoted to said base on a common axis substantially parallel with the axis of rotation of said abrading wheel, each of said heads having a longitudinal bearing adjacent the ends thereof opposite the pivot, a separate holding device having rotatable clamping jaws engaging the opposed side surfaces of work to be abraded, with one of said rotatable jaws having a projection fitting within the bore extending within the bearing and rotatably secured therein, and means for imparting a rotary movement to said clamping jaws to rotate the work when in engagement with the abrading wheel.

5. In a device of the character described, a base having an abrading wheel rotatably supported thereon, a pair of work supporting heads pivoted to said base about a common axis for movement selectively toward and away from the abrading wheel, each of said heads having a bearing adjacent the ends thereof opposite the pivot connection, a sleeve rotatably supported in each of said bearings, separate work holding means having a pair of rotatable clamp jaws for engaging the opposed side surfaces of work to be abraded, with one of said jaws having a tapered projection adapted to extend within the sleeve and means for securing said tapered projection in said sleeves to rotatably support the work holding means in the bearings, with one of said work holding means being located above the other in the direction of the longitudinal face of the wheel.

ALBERT E. MAYNARD.